Feb. 12, 1963 M. E. CONNELLY 3,077,544

CONTROLLED TRANSMISSION GATE UTILIZING CONVENTIONAL AND FOUR-LAYER DIODES IN BRIDGE CONFIGURATION

Filed May 18, 1959

INVENTOR.
MARK E. CONNELLY
BY
Laurence S. Epstein
ATTORNEYS

United States Patent Office 3,077,544

Patented Feb. 12, 1963

3,077,544

CONTROLLED TRANSMISSION GATE UTILIZING CONVENTIONAL AND FOUR-LAYER DIODES IN BRIDGE CONFIGURATION

Mark E. Connelly, Concord, Mass., assignor, by mesne assignments, to the United States of America as represented by the Secretary of the Navy Filed May 18, 1959, Ser. No. 814,121

6 Claims. (Cl. 307—88.5)

This invention relates generally to gating circuits and more particularly to a sample and hold gating circuit employing a combination of four-layer diodes and conventional diodes to produce an efficient gate.

In a sample and hold gate, the output voltage assumes a steady value during the enable interval. This value is held during the disable interval, until the arrival of a next enabling pulse, at which time the output voltage assumes a new value, corresponding to the new value of the input voltage. The storage device most commonly employed in such a circuit is a capacitor. The requirements of the sample and hold gate then is such that the impedance seen by the capacitor in the disabled state is extremely high to prevent any appreciable discharge of the capacitor during the hold portion of the cycle. It is also necessary that the transmission impedance in the enabled state be sufficiently low so that the capacitor may be charged to the output voltage in as short a time as possible. With regard to these specific requirements, the prior art is greatly lacking.

In the sample and hold gate circuit which has been invented, four-layer diodes are utilized. The four-layer diode volt-ampere characteristics are such that a negative resistance region is bonded by two stable states: a high conductance region and a high impedance region, which according to published characteristics corresponds to impedances of ten to thirty ohms and ten to 100 megohms respectively.

Figure 1:
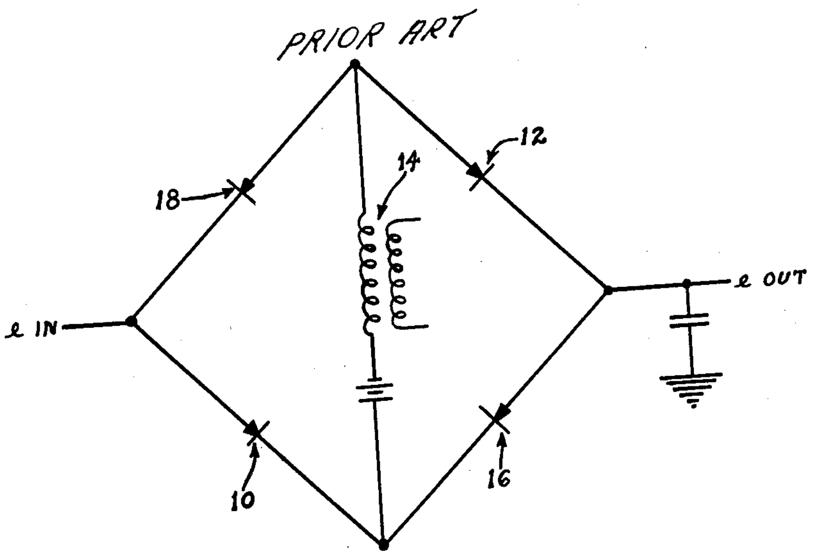

With these facts in mind, the prior art gate circuit which the instant invention improves on and replaces is discussed and reference is made to FIGURE 1. When a positive voltage exists at the input to the gate circuit, and the pulse transformer 14 is pulsed, diode 10 is gated on. This furnishes a positive voltage to the cathode of diode 16 and gates this diode off. However, diode 12 is gated on by the presence of the positive input voltage at its plate. Thus, conduction from the input to the output is via diode 10, transformer 14 and diode 12 when a positive voltage is present at the input to the gate circuit. When a negative voltage is present at the input to the gate conductive path is reversed. That is, conduction is through diode 16, pulse transformer 14 and diode 18. As is to be noted from the examination of FIGURE 1, conduction is always through the pulse transformer 14. Also, it is noted that a bias supply is necessary.

The instant invention overcomes all of the inherent limitations of this prior art circuit and produces a faster, more accurate circuit.

A principal object of the instant invention is to provide a high speed high performance sample and hold gate.

Another object of the instant invention is to provide a gate circuit having extremely low impedance during an enabled period and extremely high impedance during a disabled period.

Still another object of the instant invention is to provide a sample and hold gate utilizing four-layer diodes.

Still another object of the instant invention is to provide an inexpensive high performance sample and hold gate circuit.

Figure 2:
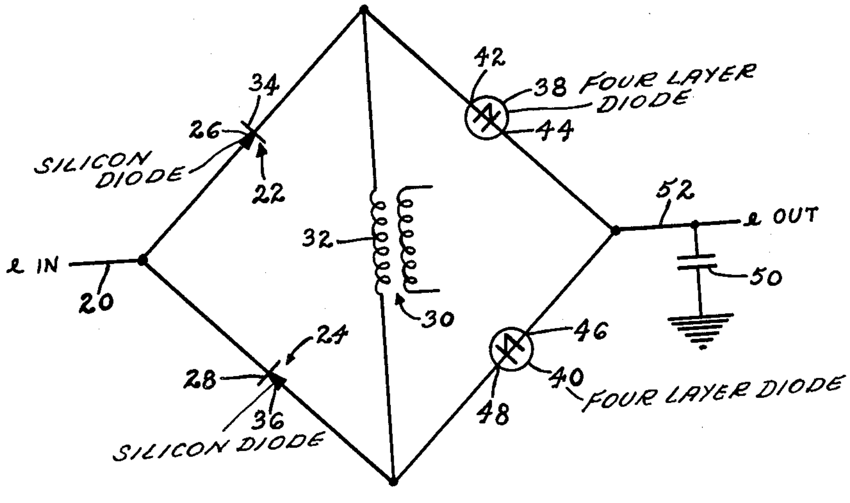

Other objects and many of the attendant advantages of this invention will be readily appreciated as the same becomes better understood by reference to the following detailed description when considered in connection with the accompanying drawings wherein:

FIGURE 1, which has already been discussed, is a schematic of the prior art circuit upon which the instant invention improves and replaces, and FIGURE 2 is a schematic of the instant invention.

Referring to FIGURE 2 an input conductor 20 is shown connected to two diodes 22 and 24. As is shown, the diode 22 has its plate 26 connected to the conductor 20 and the diode 24 has its cathode 28 connected to the conductor 20. A pulse transformer 30 has its secondary winding 32 connected to the cathode 34 of diode 22. Also, transformer winding 32 is connected to the plate 36 of diode 24. Diodes 22 and 24 in the preferred form of the invention are silicon diodes.

Transformer winding 32 is also coupled to diode 38 and diode 40. To successfully practice the instant invention, diodes 38 and 40 must be four-layer diodes. Diode 38 has its plate 42 connected to the transformer secondary 32 and has its cathode 44 connected to the plate 46 of diode 40. The cathode 48 of diode 40 is then connected to the secondary 32.

In this form of the invention a storage device is utilized. The storage device in this preferred form of the invention is a capacitor 50 which is connected to the output conductor 52. Output conductor 52 is connected to the cathode 44 of diode 38 and to the plate 46 of diode 40.

In operation, the instant invention is practiced as follows: With no pulse applied to the transformer 30, the four-layer diodes 38 and 40 are in the non-conducting or high impedance state, hence any charge appearing on the capacitor 50 will tend to remain stored there. However, when a voltage pulse is applied to the input of the transformer 30 of such polarity that the plate 42 is positive with respect to the cathode 48, the breakdown voltage of the two four-layer diodes is exceeded and both are converted to the low impedance or conducting state. The current circulating in the loop containing the two four-layer diodes and the pulse transformer will maintain the diodes in this condition until the voltage pulse into the transformer is removed.

If the voltage impressed on the input conductor 20 is positive with respect to the voltage appearing on the output conductor 52, the diode 22 is forward-biased and current will flow readily through the low-impedance path formed by the diode 22 and the four-layer diode 38, thus causing the capacitor 50 to charge and equalizing the voltages at input and output.

If the voltage impressed on the input conductor 20 is negative with respect to the voltage appearing on the output conductor 52, the diode 24 is forward biased and current will flow readily through the low-impedance path formed by the diode 24 and the four-layer diode 40, thus causing the capacitor 50 to discharge and equalizing the voltage at input and output.

Note that the positive enabling pulse at plate 42 which enables the four-layer diode and keeps them in a conducting state, does reverse bias diode 22 for the time of its duration. However, the duty cycle of the enabling pulse is small compared to the duty cycle of $e_{in}$, therefore having no effect on the operation of the circuit.

As is to be noted, with the exception of the small circulating current necessary to keep the four-layer diodes in the conducting state, no conduction is through the transformer 30. Also, because of the nature of the four-layer diodes, no bias supply is required to keep them in the non-conducting state once they have returned to that state by the removal of the enabling pulse.

Obviously many modifications and variations of the present invention are possible in the light of the above teachings. It is therefore to be understood that within the scope of the appended claims the invention may be practiced otherwise than as specifically described.

What I claim is:

1. A gate circuit comprising a four-layer diode bridge and pulse gating means connected thereacross, said diode bridge comprising a first pair of diodes, one diode of which is biased forwardly, input means connected between the diodes in said first pair of diodes, a second pair of diodes coupled to said first pair of diodes, and output means coupled between the diodes in said second pair of diodes, each of the diodes having a cathode element and an anode element, said cathode element of one diode being coupled to an anode element of only one other diode, and said second pair of diodes consisting of four-layer diodes, said gate circuit passing a voltage on said input means to said output means when said gating means is energized.

2. The structure of claim 1 wherein said pulse gating means is a pulse transformer.

3. The structure of claim 1 wherein the first diode pair consists only of silicon diodes.

4. The structure of claim 3 wherein the pulse gating means is a pulse transformer.

5. The structure of claim 4 including storage means coupled to the output means.

6. The structure of claim 5 wherein said storage means is a capacitor.

References Cited in the file of this patent

UNITED STATES PATENTS

| | | |
|---|---|---|
| 2,220,098 | Guanella | Nov. 5, 1940 |
| 2,728,042 | Ruhland | Dec. 20, 1955 |
| 2,774,932 | Patton | Dec. 18, 1956 |
| 2,782,307 | Von Sivers et al. | Feb. 19, 1957 |
| 2,817,757 | Durbin | Dec. 24, 1957 |
| 2,829,251 | Patton | Apr. 1, 1958 |
| 2,847,159 | Curtis | Aug. 12, 1958 |
| 2,854,651 | Kircher | Sept. 30, 1958 |
| 2,944,164 | Odell et al. | July 5, 1960 |
| 2,951,124 | Hussey et al. | Aug. 30, 1960 |
| 2,951,125 | Andrews | Aug. 30, 1960 |
| 2,965,767 | Wanlass | Dec. 20, 1960 |
| 2,965,771 | Finkel | Dec. 20, 1960 |
| 3,048,712 | Alm | Aug. 7, 1962 |